United States Patent [19]

Bishop

[11] 4,319,660
[45] Mar. 16, 1982

[54] MECHANICAL NOISE SUPPRESSOR FOR SMALL ROCKET MOTORS

[75] Inventor: Charles R. Bishop, Arab, Ala.

[73] Assignee: The United States of America as represented by the Secretary of the Army, Washington, D.C.

[21] Appl. No.: 183,604

[22] Filed: Sep. 2, 1980

[51] Int. Cl.³ ............................................. F01N 1/24
[52] U.S. Cl. ........................................ 181/222; 181/258
[58] Field of Search ............... 181/222, 223, 247–248, 181/252, 256–258; 60/254, 264; 239/265.15, 265.19

[56] References Cited

U.S. PATENT DOCUMENTS

| 1,127,250 | 2/1915 | Humm | 181/223 |
| 1,554,534 | 9/1925 | Straussler | 181/258 |
| 2,855,068 | 10/1958 | Chapel | 181/252 |
| 3,521,429 | 7/1970 | Leffler | 181/256 X |

FOREIGN PATENT DOCUMENTS 2232559  1/1974  Fed. Rep. of Germany ...... 181/257

Primary Examiner—L. T. Hix
Assistant Examiner—Thomas H. Tarcza
Attorney, Agent, or Firm—Nathan Edelberg; Robert P. Gibson; Harold W. Hilton

[57] ABSTRACT

A noise suppressor for small rocket motors including a plurality of perforated metal cylinders disposed in concentric relation and secured to a support plate. A noise suppression material is disposed in the chamber of each adjacent cylinder. Noise suppression material is also disposed in the center cylinder and is expelled by the rocket motor thrust. A collar on the support plate secures the motor to the suppressor.

4 Claims, 2 Drawing Figures

MECHANICAL NOISE SUPPRESSOR FOR SMALL ROCKET MOTORS

DEDICATORY CLAUSE

The invention described herein may be manufactured, used, and licensed by or for the Government for governmental purposes without the payment to me of any royalties thereon.

BACKGROUND OF THE INVENTION

Numerous devices have been produced for noise suppression of small arms. Some such devices use a variety of springs and baffles and pressure relief valves assembled in metal tubes to suppress noise.

In such conventional small arms suppressors, the projectile passes through the suppressor and acts as a piston or plug, holding back the hot gases momentarily and allowing the gases to escape through and around the various springs and baffles, breaking up the gas flow, thus reducing the noise level.

In a rocket motor, however, gases flow directly from the nozzle to the atmosphere and no projectile is in front of the exhaust flow as in the case of small arms.

It is, therefore, an object of the present invention to provide a mechanical noise suppressor for small rocket motors.

SUMMARY OF THE INVENTION

A noise suppressor for small rocket motors comprising a support member having a plurality of heavy gage perforated metal cylinders secured thereto and extending therefrom in concentric relation to form a plurality of chambers therebetween. The inner most chamber is filled with a noise suppressing wire mesh and the remaining chambers are filled with a noise suppressing material such as screen wire. A mounting element is secured to the support member to support the rocket motor therein.

DESCRIPTION OF THE PREFERRED EMBODIMENT

Figure 1:
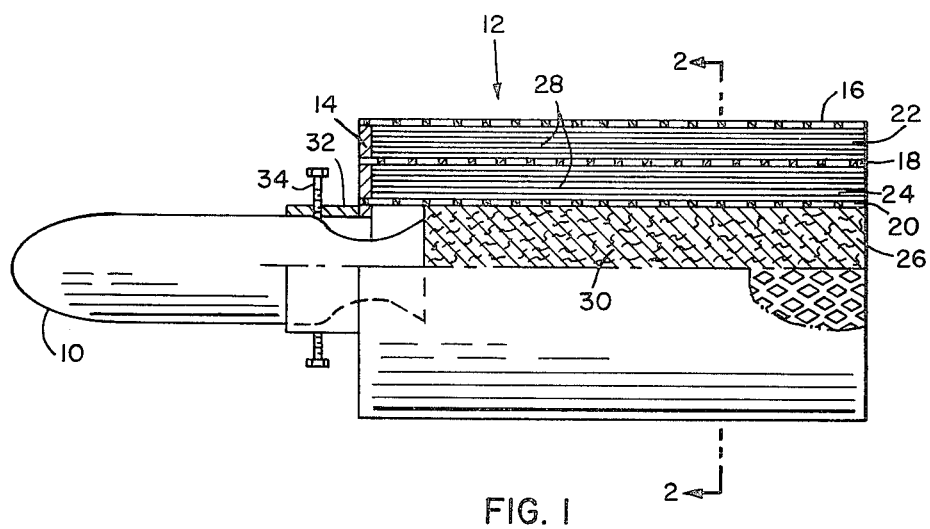
FIG. 1 is an elevational view, partially in section of the noise suppressor of the present invention.
Figure 2:
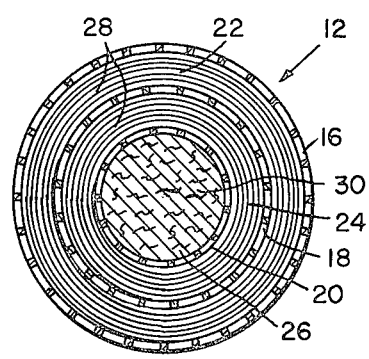
FIG. 2 is an end elevational sectional view taken along line 2—2 of FIG. 1.

As seen in FIG. 1, a rocket motor 10 is mounted in a noise suppressor assembly 12. The assembly includes a plate or support member 14 disposed for support of a plurality of cylinders made of perforated heavy gage metal. In FIG. 1 three cylinders, 16, 18, and 20 are shown in concentric relation to form chambers 22, 24, and 26. A noise suppressing material of copper screen wire 28 fills chambers 22 and 24 and a wire mesh coil 30 fills chamber 26. The copper screen wire is rolled around cylinders 18 and 20 in overlapping relation to substantially fill chambers 22 and 24.

Secured to plate 14 by welding, or the like, is a collar 32 having a plurality of set screws 34. The rocket motor may be attached to the noise suppressor assembly 12 by being positioned in collar 32 and secured therein by set screws 34. However, this is done during testing of the motor or suppressor.

On a tactical system if the weapon were fired in an enclosed area, such as a small building, the suppressor is attached to the launcher. The motor of the missile, in this case, would be aligned in the collar and not secured therein by the set screws. The use of the suppressor in a small building prevents over pressure which could result in the collapse of the building.

In operation, the wire mesh, which is "stuffed" in the central chamber, is blown out and the screen in the outer jackets remain in place. The wire mesh in the central chamber acts somewhat like the projectile in the small arms noise suppressor and has the effect of dispersing the gases through the outer jackets.

While copper screen wire is set forth as the material filling the outer chambers and a wire mesh coil or "stuffing" is set forth as the material filling the central chambers, obviously, other materials, which will serve to suppress noise may be resorted to.

I claim:

1. A noise suppressor for small rocket motors comprising:
   (a) a support member;
   (b) a plurality of perforated members secured to said support member, said perforated members disposed in concentric relation and each forming an annular chamber with the adjacent perforated member, and the center said perforated member enclosing a central chamber;
   (c) noise suppression means carried in each said chamber, said noise suppression means in said central chamber being packed therein and disposed for being expelled from said chamber responsive to ignition of said rocket motor; and,
   (d) means carried on said support member for aligning said noise suppressor to said rocket motor.

2. A device as in claim 1 wherein said noise suppressing material in the outer annular chambers is rolled copper wire screen sheets, rolled around the perforated members in overlapping relation.

3. A device as in claim 2 wherein said noise suppressing material in the central chamber is copper meshed wire.

4. A device as in claim 3 wherein said means for aligning said noise suppressor to said rocket motor is a collar secured to said support member and provided with a plurality of set screws therein.

* * * * *